(12) United States Patent
Wellhoefer et al.

(10) Patent No.: US 9,174,604 B2
(45) Date of Patent: Nov. 3, 2015

(54) ACTIVATION SYSTEM FOR ACTUATORS OF A VEHICLE SEAT DEVICE

(75) Inventors: Matthias Marcus Wellhoefer, Stuttgart (DE); Werner Nitschke, Asperg (DE); Monika Nitschke, legal representative, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/342,100

(22) PCT Filed: Jul. 5, 2012

(86) PCT No.: PCT/EP2012/063100
§ 371 (c)(1),
(2), (4) Date: Jun. 6, 2014

(87) PCT Pub. No.: WO2013/029844
PCT Pub. Date: Mar. 7, 2013

(65) Prior Publication Data
US 2014/0284908 A1    Sep. 25, 2014

(30) Foreign Application Priority Data

Sep. 2, 2011    (DE) .......................... 10 2011 082 058

(51) Int. Cl.
*B60R 21/261*    (2011.01)
*B60R 21/263*    (2011.01)
*B60R 21/268*    (2011.01)
(Continued)

(52) U.S. Cl.
CPC ............ *B60R 21/263* (2013.01); *B60N 2/0276* (2013.01); *B60N 2/427* (2013.01); *B60R 21/261* (2013.01); *B60R 21/268* (2013.01); *B60R 2021/2612* (2013.01)

(58) Field of Classification Search
CPC ................ B60R 21/207; B60R 21/268; B60R 2021/335; B60R 2021/01034; B60R 2021/01231; B60R 2021/01252; B60R 2021/26052; B60R 2021/26094; B60R 2021/022; B60R 22/4628; B60R 21/261; B60R 21/263; B60R 2021/2612; B60N 2/42772; B60N 2/0276; B60N 2/427
USPC .......... 180/274, 282; 280/734–736, 742, 806; 297/216.1; 701/45
See application file for complete search history.

(56) References Cited

U.S. PATENT DOCUMENTS 3,927,901 A * 12/1975 Weman .......................... 280/734
4,006,919 A *  2/1977 Neuman ........................ 280/736
4,915,124 A *  4/1990 Sember, III .................... 137/223
(Continued)

FOREIGN PATENT DOCUMENTS

DE    41 12 579    10/1991
EP    1 561 634    8/2005
(Continued)

*Primary Examiner* — Laura Freedman
(74) *Attorney, Agent, or Firm* — Kenyon & Kenyon LLP

(57) ABSTRACT

An activation system for actuators of a vehicle seat device, including a first control device; a gas pressure accumulator having a gas pressure accumulator valve situated on it; a pressure distribution device functionally connected to the gas pressure accumulator; and a connecting device situated between the first control device and the pressure distribution device, the actuators being activatable as a function of an accident characteristic which is ascertainable with the aid of the first control device and which is transmittable to the pressure distribution device.

14 Claims, 2 Drawing Sheets

(51) Int. Cl.
   *B60N 2/427*   (2006.01)
   *B60N 2/02*   (2006.01)

(56) References Cited

U.S. PATENT DOCUMENTS

| | | | | |
|---|---|---|---|---|
| 5,947,514 | A * | 9/1999 | Keller et al. | 280/742 |
| 6,088,643 | A * | 7/2000 | Long et al. | 701/49 |
| 6,203,105 | B1 * | 3/2001 | Rhodes, Jr. | 297/284.6 |
| 6,237,948 | B1 * | 5/2001 | Maschek et al. | 280/735 |
| 6,288,636 | B1 * | 9/2001 | Kaupp et al. | 340/438 |
| 6,425,602 | B1 * | 7/2002 | Al-Amin et al. | 280/730.2 |
| 7,086,663 | B2 * | 8/2006 | Honda | 280/730.2 |
| 7,168,739 | B2 * | 1/2007 | Shimizu | 280/735 |
| 7,377,544 | B2 * | 5/2008 | Itoga | 280/733 |
| 7,591,481 | B2 * | 9/2009 | McCormick | 280/736 |
| 2002/0166710 | A1 | 11/2002 | Breed | |
| 2003/0137135 | A1 * | 7/2003 | Welz | 280/741 |
| 2005/0218632 | A1 * | 10/2005 | Cuevas et al. | 280/730.1 |
| 2007/0200323 | A1 * | 8/2007 | Bertele et al. | 280/730.2 |
| 2008/0030012 | A1 * | 2/2008 | Mattes et al. | 280/736 |
| 2009/0200775 | A1 * | 8/2009 | Sugimoto et al. | 280/730.2 |
| 2014/0326320 | A1 * | 11/2014 | Wellhoefer et al. | 137/1 |

FOREIGN PATENT DOCUMENTS

| | | |
|---|---|---|
| JP | 11230987 | 8/1991 |
| JP | 2003237520 | 8/2003 |
| JP | 2004500273 | 1/2004 |
| JP | 2004501824 | 1/2004 |
| JP | 2005193844 | 7/2005 |
| JP | 2006219096 | 8/2006 |
| JP | 2007091083 | 4/2007 |
| JP | 2008030528 | 2/2008 |
| JP | 2011098697 | 5/2011 |
| WO | 01/13767 | 3/2001 |
| WO | 01/45985 | 6/2001 |
| WO | WO 2007/020219 | 2/2007 |

* cited by examiner

ACTIVATION SYSTEM FOR ACTUATORS OF A VEHICLE SEAT DEVICE

FIELD OF THE INVENTION

The present invention relates to an activation system for actuators of a vehicle seat device. Furthermore, the present invention relates to a method for activating actuators of a vehicle seat device.

BACKGROUND INFORMATION

Today, various seat actuators are known in the field of automotive safety technology for protecting vehicle occupants, some of which are electrically activated, and some of which are pyrotechnically activated. The actuators are generally integrated into the vehicle seats, a triggering or activation of the actuators being carried out by an airbag control unit which is situated outside the vehicle seats. The airbags are generally triggered with the aid of gas generators, an electrical ignition line being connected to the airbag and electrical ignition energy being used to ignite the gas generator or the gas cartridge of the airbag. The gas generator contains a precisely measured quantity of propellant which is pressed into pellet form and housed in an enclosed combustion chamber.

Conventional protection systems for the safety belt have a separate activation mechanism which, like the airbags, is activated by the airbag control unit.

Pressure distribution systems having solenoid valves are known in electronically controlled vehicle braking systems.

In certain systems, it is believed to be disadvantageous that the gas generated when burning the propellant chemicals of the gas generators is very hot, making it necessary for the airbags to have an additional protective coating in order to protect the airbags from burning damage. In addition, every airbag requires its own electrical ignition line, via which it is activated with the aid of the above-described electrical ignition energy.

SUMMARY OF THE INVENTION

An object of the present invention is to provide an improved activation concept for protection systems of a vehicle seat.

This object is achieved with the aid of an activation system for actuators of a vehicle seat device, having:
a first control device;
a gas pressure accumulator having a gas pressure accumulator valve situated on it;
a pressure distribution device functionally connected to the gas pressure accumulator; and
a connecting device situated between the first control device and the pressure distribution device, the actuators being activatable as a function of an accident characteristic which is ascertainable with the aid of the first control device and which is transmittable to the pressure distribution device.

It is advantageously possible with the aid of the activation system according to the present invention to activate all actuators of the vehicle seat device centrally and selectively as a function of an ascertained accident characteristic. The gas pressure accumulator provides a uniform, central energy storage system with the aid of which all actuators of the vehicle seat device are supplied with energy. This advantageously results in a reduction of control lines and plug pins for the individual actuators and improved modularity of the overall activation system.

One advantageous refinement of the activation system provides that the pressure distribution device includes a second control device and at least two valves, the valves being controllable according to the accident characteristic with the aid of the second control device. A kind of central pressure switch is thus provided, via which the gas pressure from the gas pressure accumulator is distributed to the protection actuators to be activated as a function of the position of the valves.

The connecting device may be configured as an electronic data line. Parameters of the accident characteristic are transmitted from the first control device to the pressure distribution device with the aid of the electronic data line, analogous electrical power current advantageously not being required for activating the individual protection systems.

One specific embodiment of the activation system provides that the gas pressure valve is controllable with the aid of the second control device. It is thus advantageously made possible for the gas pressure accumulator valve also to be able to be opened and closed multiple times, depending on the accident characteristic, so that individual protection actuators of the vehicle seat device may also be activated multiple times at time intervals if necessary.

One specific embodiment of the activation system provides that the gas pressure accumulator valve has a pressure sensor. The pressure sensor makes it possible to monitor a gas pressure during the escape of the gas from the gas pressure accumulator and to ascertain an existing pressure in the gas pressure accumulator, so that the additional control of the actuators of the vehicle seat device may be carried out according to the situation.

One advantageous refinement of the activation system provides that the actuators are directly and/or indirectly activatable with the aid of the gas pressure of the gas pressure accumulator. In this way, it is, for example, advantageously possible to use the gas pressure of the gas pressure accumulator directly for inflating various airbags of the vehicle seat device. Alternatively and/or in addition, it is also possible to use the gas pressure for a mechanical position adjustment of mechanical protection elements of the vehicle seat device.

One specific embodiment of the activation system provides that the valves are variably controllable as a function of time with the aid of the pressure distribution device. It is thus advantageously made possible to control the actuators centrally with the aid of the pressure distribution device.

One refinement of the activation system according to the present invention provides that the gas pressure accumulator is directly connectable to the pressure distribution device. An integrated space is thus advantageous minimized, and a connecting line between the gas pressure accumulator and the pressure distribution device is rendered obsolete.

One specific embodiment of the activation system according to the present invention provides that the gas pressure accumulator is configured as a cold-gas pressure accumulator. With the aid of this kind of gas pressure accumulator, it is advantageously possible to minimize a temperature arising during the escape of the gas from the gas pressure accumulator, so that the protective coatings of the conventional airbags which are inflated with the aid of conventional gas generators may be omitted. It is thus advantageously possible to manufacture the airbags which are to be inflated via the gas from the cold-gas pressure accumulator more simply and economically.

One specific embodiment of the activation system provides that a portion of a frame of the vehicle seat device is formed as a sole or at least additional gas pressure accumulator. This makes it possible to adjust the size of a volume of the gas pressure accumulator very flexibly according to the design of the vehicle seat device using corresponding specific protection actuators.

Additional specific embodiments of the activation system according to the present invention provide that the system is at least partially situated in a seat pan or at least partially in a backrest of the vehicle seat device. This type of arrangement of the activation system makes it possible to match the activation system advantageously to existing space resources within the vehicle, so that it is possible to adapt it flexibly to space resources within the vehicle seat device or to requirements with respect to the protection systems to be activated.

One specific embodiment of the activation system according to the present invention is described in greater detail with the aid of two figures. It goes without saying that no specific design features are to be inferred from the figures and that the figures serve primarily to illustrate the essential principles of the invention. In particular, protection systems or actuators of vehicle seats known per se are not described in greater detail below.

DETAILED DESCRIPTION

Figure 1:
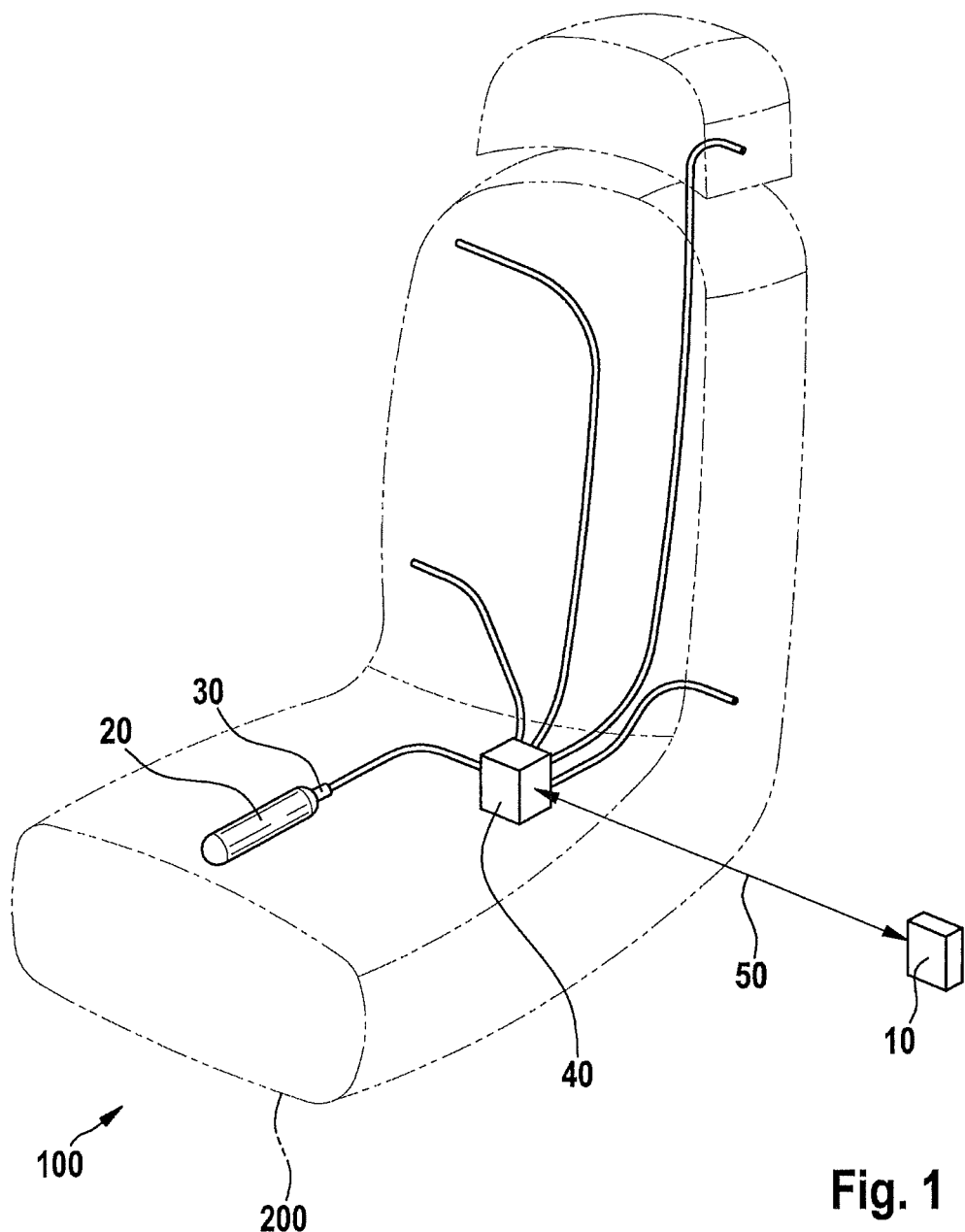
FIG. 1 shows a basic principle of a specific embodiment of the activation system according to the present invention.

FIG. 1 shows a vehicle seat device 200 whose protection systems or protection actuators (not shown) may be activated with the aid of a specific embodiment of activation system 100 according to the present invention. Activation system 100, which is mostly situated in a seat pan of vehicle seat device 200, includes a first control device 10 which may be configured as an airbag control unit. First control device 10 may be situated in a central area of a motor vehicle (not shown) and is used to detect an accident or collision characteristic of the vehicle using multiple parameters (for example, type, severity, and direction of the collision) with the aid of one or multiple crash sensor(s) and to transmit them to a pressure distribution device 40 situated in vehicle seat device 200 with the aid of a connecting device 50.

Connecting device 50 may be configured as a digital electronic data line on which various data transmission protocols may be used for transmitting the accident characteristic. For example, the accident characteristic may be transferred to pressure distribution device 40 with the aid of the known CAN (controller area network) protocol. Other data transmission protocols for transferring the accident characteristic from first control device 10 to pressure distribution device 40 are also conceivable, bidirectional communication between first control device 10 and pressure distribution device 40 of course also being conceivable.

Pressure distribution device 40 is also functionally connected to a gas pressure accumulator 20. Gas pressure accumulator 20 may be configured as a cold-gas pressure accumulator or a cold-gas reservoir which confines a gas (for example, helium) under high pressure (for example, approximately 800 bar). A gas pressure accumulator valve 30 is furthermore situated on gas pressure accumulator 20, which is provided to withdraw gas from gas pressure accumulator 20 and to route it to pressure distribution device 40 via a tubular connecting line. A pressure sensor (not shown) may be situated on gas pressure accumulator valve 30 or on gas pressure accumulator 20, which allows observation of an escape of gas from gas pressure accumulator 20 due to loss of pressure in gas pressure accumulator 20 or ascertainment of a level of a gas pressure within gas pressure accumulator 20.

The functional connection between pressure distribution device 40 and gas pressure accumulator 20 allows, on the one hand, the gas to be able to be routed from gas pressure accumulator 20 to pressure distribution device 40. In addition, pressure distribution device 40 is thus able to activate gas pressure valve 30, so that a transmission of the gas from gas pressure accumulator 20 to pressure distribution device 40 is controllable. Pressure distribution device 40 has a second control device (not shown) which may be configured as an electronic control circuit, with the aid of which multiple solenoid valves (not shown) which are situated on pressure distribution device 40 may be controlled. The solenoid valves may be situated in peripheral holes of pressure distribution device 40, which is formed as a light-metal block (for example, aluminum). The holes are interconnected by channels inside pressure distribution device 40 and thus represent a type of fluid switch as used, for example, in ABS or ESP control units. The gas is selectively distributed by pressure distribution device 40 via the above-mentioned solenoid valves to the protection actuators situated in vehicle seat device 200 in a star configuration according to the principle of a pressure switch.

A conventional ABS or ESP control unit having a reduced range of functions may be used as pressure distribution device 40, which, for the purposes of the present invention, must merely be able to recognize and process the data with respect to the accident characteristic which is transmitted from first control device 10 via connecting device 50. In this way, reusability or a manufacturing derivation of electronic control units of the vehicle which are known per se is made possible. Development effort for pressure distribution device 40 may thus be advantageously minimized. Pressure distribution device 40 furthermore includes a second control device (not shown), which may be configured as an electronic control circuit. The solenoid valves of pressure distribution device 40 may be activated with the aid of the second control device. Protection actuators of vehicle seat device 200 may be activated via gas pressure from gas pressure accumulator 20 with the aid of tubular actuator lines which branch off the solenoid valves of pressure distribution device 40.

It is thus possible to activate the protection actuators of vehicle seat device 200 exclusively via gas pressure from gas pressure accumulator 20 with the aid of activation system 100 according to the present invention. Since the above-mentioned actuators are known in principle, they are not shown in FIG. 1, and only an abbreviated listing of the protection actuators for which activation system 100 according to the present invention may be used is provided below. It is not claimed that the listing is complete; thus, it is expressly intended for activation system 100 according to the present invention to be used for other protection actuators which are not mentioned below.

The following actuators of vehicle seat device 200 may be activated pneumatically via gas pressure with the aid of activation system 100 according to the present invention:
 a seat backrest adjustment for achieving an optimal seat position in the event of an accident;
 a seat position adjustment in the event of an accident in the longitudinal direction;

an active headrest against the so-called whiplash effect, which may be responsible for whiplash injury ("whiplash syndrome") in the event of a rear collision;

a head airbag coupled to vehicle seat device 200 for protecting the head in the event of a lateral collision;

activatable mechanical side flaps for stabilizing and supporting the occupant in the event of whiplash events and/or lateral collision;

a seat-mounted torso airbag for protecting the body/torso in the event of a lateral collision;

seat-belt tensioners for the pelvic area including a ratcheting function for stabilizing the occupant and coupling in the event of an accident;

a so-called "anti-submarining" airbag, which brings about a positioning/inflation of a seat cushion against the submarining effect in the event of a frontal collision.

For the purposes of the present invention, it is necessary under certain circumstances only to modify the above-mentioned actuators slightly, if applicable, in such a way that they may be activated by pressure distribution device 40 via gas pressure with the aid of a gas pressure supply line.

Figure 2:
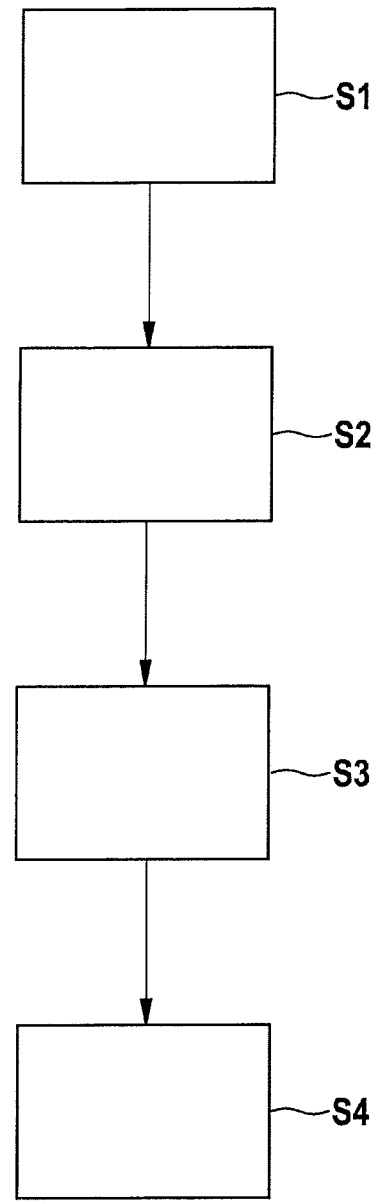
FIG. 2 shows a basic flow chart of a specific embodiment of the method according to the present invention for activating actuators of a vehicle seat device.

The functionality of activation system 100 according to the present invention is described below with the aid of a basic flow chart shown in FIG. 2.

In the event of an accident of the vehicle, first control device 10 identifies the kind of accident or collision (step S1) and transmits this information via connecting device 50 to pressure distribution device 40 (step S2). Depending on the accident characteristic, a specific actuator triggering strategy is followed. The required valve positioning strategy for controlling the valves of pressure distribution device 40 for the particular situations may be stored for this purpose in a memory in the second control device of pressure distribution device 40.

According to the situation, the second control device may control the solenoid valves (outlet valves) of pressure distribution device 40 according to the control strategy (step S3), and opens gas pressure accumulator valve 30 of gas pressure accumulator 20 after the valves have been positioned. The gas pressure of gas pressure accumulator 20 is thus routed into the intended channels to the protection actuators to be activated via the outlet valves of pressure distribution device 40 (step S4).

In the event that a time-dependent variable control of the outlet valves is provided, the control of the valves over time is assumed by the second control device, so that valves which are already open may close again and reopen under certain circumstances. For example, it may be necessary that a pelvic seat belt tensioner is activated first, after which an activation of the torso airbag is subsequently carried out. Information about the residual quantity of gas in gas pressure accumulator 20 may be transmitted to first control device 10 via connecting device 50 with the aid of the pressure sensor, so that a repeated activation of protection actuators may be initiated by first control device 10 as a function of this information.

The specific embodiment of activation system 100 shown in FIG. 1 may be completely or partially situated in a seat pan of vehicle seat device 200. Alternatively, activation system 100 may also be completely or partially integrated into a backrest of vehicle seat device 200 (not shown). As an advantageous option of a design of gas pressure accumulator 20, it is also conceivable that a portion of the actual seat frame (for example, a hollow section) of vehicle seat device 200 is used as a sole or at least an additional pressure accumulator.

Vehicle seat device 200 may be formed as a single seat in the front or rear area of the vehicle. However, activation system 100 according to the present invention may also be used very well in partial or full bench seats, including bench seats in buses, streetcars, etc., a correspondingly enlarged gas pressure accumulator 20 having correspondingly more solenoid valves on pressure distribution device 40 being provided under certain circumstances in the above-mentioned cases. The activation system may be developed to be optimized directly for this purpose or implemented very simply as a reuse of existing, established products such as, for example, ABS/ESP control units.

In summary, a uniform activation system for actuators of a vehicle seat device is provided, which is able to selectively activate all protection systems in the seat pneumatically via gas pressure with the aid of a cold-gas pressure accumulator. The pressure of the gas pressure accumulator may activate the actuator directly (for example, inflate the airbag) or mechanically activate another control mechanism (for example, carry out an adjustment of side flaps in the vehicle seat). For this purpose, a unit is provided which is integrated into the seat and has control electronics and multiple solenoid outlet valves and which carries out an intelligent distribution/control of the pressure from the gas pressure accumulator.

By reusing at least valve components up to entire ABS/ESP units which are equipped with reduced functionality, it is possible to reduce costs advantageously through volume effects. The system according to the present invention is completely encapsulated in the vehicle seat by joining the major components: gas pressure accumulator, gas pressure accumulator valve, and pressure distribution device, resulting in a fully seat-integrated system which may be advantageously integrated independently and modularly into various seats and/or bench seat combinations. Only two activation lines from the first control device are required per vehicle seat device to be activated, thus significantly reducing the cost of activation lines and plug pins compared to conventional systems.

The activation system according to the present invention has a network structure in electrical/electronic terms whose cable harness is reduced. Primary communication within the activation system according to the present invention or within an internal on-board electrical/electronic network including the activation system according to the present invention is carried out via the interface between the first control device and the pressure distribution device.

Under certain circumstances, the triggering or activation according to the present invention may make the actuator system even faster than conventional systems, for example, in areas where an electric motor is used conventionally for a mechanical adjustment of protection elements.

With the aid of the present invention, a uniform, integrated energy system is thus advantageously provided for triggering or activating all protection systems in the vehicle seat.

It goes without saying that the described activation system according to the present invention may be modified in a suitable manner, depending on the application case, by those skilled in the art, and elements from it may be combined in a suitable manner, without deviating from the fundamental idea according to the present invention.

What is claimed is:

1. An activation system for actuators of a vehicle seat device, comprising:
    a first control device configured to control the actuators;
    a gas pressure accumulator having a gas pressure accumulator valve situated on the gas pressure accumulator;
    a pressure distribution device functionally connected to the gas pressure accumulator; and
    a connecting device situated between the first control device and the pressure distribution device, the actuators being activatable as a function of an accident characteristic which is ascertained by the first control device and which is transmitted to the pressure distribution device; wherein the pressure distribution device includes at least two gas outlet valves and a second control device configured to control the at least two gas outlet valves according to the accident characteristic.

2. The activation system of claim 1, wherein the connecting device includes an electronic data line.

3. The activation system of claim 1, wherein the gas pressure accumulator valve is controllable with the aid of the second control device.

4. The activation system of claim 1, wherein the gas pressure accumulator valve has a pressure sensor.

5. The activation system of claim 1, wherein the actuators are at least one of directly activatable and indirectly activatable with the aid of gas pressure of the gas pressure accumulator.

6. The activation system of claim 1, wherein the at least two gas outlet valves are variably controllable as a function of time with the aid of the pressure distribution device.

7. The activation system of claim 1, wherein the gas pressure accumulator is directly connectable to the pressure distribution device.

8. The activation system of claim 1, wherein the gas pressure accumulator includes a cold-gas pressure accumulator.

9. The activation system of claim 1, wherein a portion of a frame of the vehicle seat device is designed as a sole or at least an additional gas pressure accumulator.

10. The activation system of claim 1, wherein the system is at least partially situated in a seat pan of the vehicle seat device.

11. The activation system of claim 1, wherein the system is at least partially situated in a backrest of the vehicle seat device.

12. A method for activating actuators of a vehicle seat device, comprising:
ascertaining an accident characteristic by a first control device configured to control the actuators;
transmitting the accident characteristic from the first control device to a pressure distribution device having at least two gas outlet valves and a second control device, wherein the actuators are activatable as a function of the accident characteristic ascertained by the first control device and transmitted to the pressure distribution device;
controlling the at least two gas outlet valves of the pressure distribution device by the second control device as a function of the accident characteristic; and
controlling, by the second control device, opening of a gas pressure accumulator valve of a gas pressure accumulator connected functionally to the pressure distribution device.

13. The method of claim 12, wherein the gas pressure accumulator valve is controlled in a time-variable manner.

14. The method of claim 12, wherein the at least two gas outlet valves of the pressure distribution device are controlled in a time-variable manner.

* * * * *